US005233689A

United States Patent [19]

Rhoden et al.

[11] Patent Number: 5,233,689

[45] Date of Patent: Aug. 3, 1993

[54] METHODS AND APPARATUS FOR MAXIMIZING COLUMN ADDRESS COHERENCY FOR SERIAL AND RANDOM PORT ACCESSES TO A DUAL PORT RAM ARRAY

[75] Inventors: Desi Rhoden, Boulder; Darel N. Emmot, Fort Collins, both of Colo.

[73] Assignee: Hewlett-Packard Company, Palo Alto, Calif.

[21] Appl. No.: 494,701

[22] Filed: Mar. 16, 1990

[51] Int. Cl.[5] .............................................. G06F 15/62

[52] U.S. Cl. .................................... 395/162; 395/164

[58] Field of Search ............................... 395/162-166, 395/133

[56] References Cited

U.S. PATENT DOCUMENTS

| | | | |
|---|---|---|---|
| 4,553,171 | 11/1985 | Holladay et al. | 358/263 |
| 4,701,863 | 10/1987 | Bruce | 364/518 |
| 4,716,546 | 12/1987 | Beausoleil et al. | 364/900 |
| 4,736,442 | 4/1988 | Korafeld | 382/44 |
| 4,745,407 | 5/1988 | Costello | 340/799 |
| 4,755,810 | 7/1988 | Knierim | 340/726 |
| 4,777,485 | 10/1988 | Costello | 340/799 |
| 4,780,709 | 10/1988 | Randall | 340/721 |
| 4,816,814 | 3/1989 | Lumelsky | 340/747 |
| 4,816,815 | 3/1989 | Yoshiba | 340/750 |
| 4,816,913 | 3/1989 | Harney et al. | 358/133 |
| 4,835,607 | 5/1989 | Keith | 358/133 |
| 4,837,564 | 6/1989 | Ogawa et al. | 340/750 |
| 4,985,848 | 1/1991 | Pfeiffer et al. | 395/164 |

OTHER PUBLICATIONS

Matick et al., "All Points Addressable Raster Display Memory", IBM J. Res. Develop, vol. 28, No. 4, Jul. 1984, pp. 379-392.

*Primary Examiner*—Gary V. Harkcom
*Assistant Examiner*—Almis Jankus
*Attorney, Agent, or Firm*—Guy J. Kelley

[57] ABSTRACT

Methods and apparatus for maximizing column address coherency for serial and parallel port accesses to a dual port frame buffer. Performance of the serial port of the frame buffer is greatly improved by separating the page boundaries in the horizontal direction (i.e., scan line organized), while performance of the parallel port of the frame buffer is enhanced by organizing the page boundaries for rectangular areas of the display. Performance at both ports may be maximized at the same time by organizing the video random access memory (VRAM) into tiles and vertically barrel shifting the scan line data at a fixed interval across the video display. During operation, the serial port output looks like an entire row of data while it has actually output parts of N rows of data from two separate rows of memory chips which are changed at the fixed interval. This approach allows the parallel port to organize columns N times higher in the vertical direction. As a result, the page boundaries are N times as far apart in the vertical direction, thereby improving output performance.

11 Claims, 6 Drawing Sheets

METHODS AND APPARATUS FOR MAXIMIZING COLUMN ADDRESS COHERENCY FOR SERIAL AND RANDOM PORT ACCESSES TO A DUAL PORT RAM ARRAY

FIELD OF THE INVENTION

This invention relates to methods and apparatus for rendering graphics primitives to/from frame buffers in computer graphics systems. More specifically, this invention relates to methods and apparatus for maximizing performance of video random access memory (VRAM) arrays in graphics systems by maximizing column address coherency for serial and random port accesses to the frame buffer.

BACKGROUND OF THE INVENTION

Computer graphics workstations can provide highly detailed grapghics simulations for a variety of applications. Engineers and designers working in the computer aided design (CAD) and computer aided manufacturing (CAM) areas typically utilize graphics simulations for a variety of computational tasks. The computer graphics workstation industry has thus been driven to provide more powerful computer graphics workstations which can perform graphics simulations quickly and with increased detail.

Modern workstations having graphics capabilities generally utilize "window" systems to accomplish graphics manipulations. As the industry has been driven to provide faster and more detailed graphics capabilities, computer workstation engineers have tried to design high performance, multiple window systems which maintain a high degree of user interactivity with the graphics workstation.

A primary function of window systems in such graphics workstations is to provide the user with simultaneous access to multiple processes on the workstation. Each of these processes provides an interface to the user through its own area onto the workstation display. The overall result for the user is an increase in productivity since the user can then manage more than one task at a time with multiple windows displaying multiple processes on the workstation.

In graphics systems, some scheme must be implemented to "render" or draw graphics primitives to the system's screen. "Graphics primitives" are a basic component of a graphics picture, such as a polygon or vector. All graphics pictures are formed with combinations of these graphics primitives. Many schemes may be utilized to perform graphics primitives rendering. One such scheme is the "spline tessellation" scheme utilized in the TURBO SRX graphics system provided by the Hewlett Packard Graphics Technology division, Fort Collins, Colorado.

The graphics rendering procedure generally takes place within a piece of graphics rendering hardware called a "frame buffer." A frame buffer generally comprises a plurality of video random access memory (VRAM) computer chips which store information concerning pixel activation on the system's display screen corresponding to the particular graphics primitives which will be traced out on the screen. Generally, the frame buffer contains all the graphics data information which will be written onto the windows and stores this information until the graphics system is prepared to trace this information on the workstation's screen. The frame buffer is generally dynamic and is periodically refreshed until the information stored in it is written to the screen.

Thus, computer graphics systems convert image representations stored in the computer's memory to image representations which are easily understood by humans. The image representations are typically displayed on a cathode ray tube (CRT) device that is divided into arrays of pixel elements which can be stimulated to emit a range of colored light. The particular color of light that a pixel emits is called its "value." Display devices such as CRTs typically stimulate pixels sequentially in some regular order, such as left to right and top to bottom, and repeat the sequence 50 to 70 times a second to keep the screen refreshed. Thus, some mechanism is required to retain a pixel's value between the times that this value is used to stimulate the display. The frame buffer is typically used to provide this "refresh" function.

Frame buffers, or "display processors," for displaying data in windows on display screens in graphics rendering systems are known in the art. For example, Randall discloses in U.S. Pat. No. 4,780,709, a display processor which divides a display screen such as a CRT into a plurality of horizontal strips, with each strip being further subdivided into a plurality of "tiles." Each tile represents a portion of a window to be displayed on the screen, and each tile is further defined by tile descriptors which include memory address locations of data to be displayed in that particular tile (col. 2, lines 23-35).

Since frame buffers are usually implemented as arrays of VRAMs, they are "bit mapped" such that pixel locations on a display device are assigned x,y coordinates of the frame buffer. A single VRAM device rarely has enough storage locations to completely store all the x,y coordinates corresponding to pixel locations for the entire image on a display device, and therefore, multiple VRAMs are generally used. The particular mapping algorithm used is a function of various factors, such as what particular VRAMs are available, how quickly the VRAM can be accessed compared to how quickly pixels can be rendered, how much hardware it takes to support a particular mapping, and other factors.

Prior frame buffers in graphics systems comprised of VRAMs are generally dual port, random access memories. A serial output port develops the active video portion of a displayed video signal. Generally, signal processing circuitry accesses the VRAMs in the frame buffer via a standard input/output bus wherein the access is controlled by a VRAM control unit. As is known by those with skill in the art, data held in the VRAMs is provided to graphics processing circuitry which generally comprises decoders, first-in/first-out (FIFO) circuits, and an arithmetic and logic unit (ALU) as described, for example, in U.S. Pat. No. 4,816,913 to Harney et al.

Generated pixel value data are written to the VRAMs in the frame buffer via output FIFOs in matrix form. The matrix corresponds to lines of the video signal wherein each line has a separate number of pixel values. This matrix is referred to as the "bit map," and is read from the VRAMs by a graphics display processor to produce an image on the graphics system display device. Display processors provide horizontal line synchronizing signals and vertical field synchronizing signals to coordinate transfer of data from the VRAMs to the display processor for ultimate display on a CRT as described by Harney at col. 6, lines 7 through 24 of the aforementioned patent.

Generally, display devices in graphics systems are "raster scan" displays. Raster scan displays utilize a multiplicity of beams for simultaneously imaging data on a corresponding multiplicity of parallel scan lines. The multiplicity of beams usually write pixel value data to stimulate pixels on the display from the left side of the display CRT to the right side of the display CRT. For the purpose of dividing the CRT into tiles (a process called "tiling"), each tile is considered to comprise a depth equal to the multiplicity of scan lines, with each tile being a particular number of pixels wide. The resulting graphics primitive image thus comprises a multiplicity of parallel, non-overlapping sets of parallel lines of pixels generated by a separate sweep of electron beams across the CRT screen. The tiles are generally rectangular, and thus organize the image into arrays having a plurality of rows by a set number of columns.

Typically, raster scan displays are organized along scan lines wherein pixels in a display are activated according to the bit-mapped frame buffer coordinate pixel values. In this way, graphics primitives which potentially have random orientations and sizes are plotted on the raster display. The scanning raster CRT is accessed by the frame buffer according to row address strobe (RAS) and column address strobe (CAS) raster beams. Because of the basic random nature of graphics primitives, it is desirable from a systems standpoint to have longer distances between the RAS boundaries in the vertical direction. Prior graphics systems using frame buffers with VRAM architecture generally do not provide long distances between the RAS boundaries in the vertical direction. Thus, prior graphics systems do not solve a long-felt need in the art for systems which maximize page mode performance from VRAM arrays in the graphics subsystem.

Bit mapped systems generally utilize direct memory access (DMA) transfer sequences for transferring data from some external memory such as a ROM, cache buffer, or host processor to the VRAMs in the frame buffer. Thus, bit map systems are known which provide means for displaying characters and graphics patterns on CRT displays. For example, Ogawa et al. in U.S. Pat. No. 4,837,564 disclose such a system at col. 1, lines 17 through 40 thereof. In conventional graphics systems, DMA transfer control is performed independently of processing control of graphics primitives attributes. Since a large number of hardware components are generally necessary for realizing DMA control sequences, the circuitry for such systems is complicated and the processing speed for expanding display data in a VRAM array may be reduced. In such systems, total processing speed for DMA sequences is not satisfactorily increased thus (Ogawa et al., col. 1, lines 56 through 65). There is thus a long-felt need in the art for control data sequences for DMA transfer which increase processing speed and decrease the amount of expensive hardware necessary to perform this function.

When graphics primitives are rendered to a CRT a display refresh port receives an incrementing address from the frame buffer, and the output data is first buffered and then serialized using high speed shift registers typically built into the frame buffer architecture. The frame buffer then sends output data which drives digital to analog converters in a standard red/green/blue color monitor, or in a direct fashion to drive a black and white (monochrome) monitor. For example, such a system is described in U.S. Pat. No. 4,745,407 to Costello (col. 1, lines 32 through 55). A second update port, sometimes called a "random" port of the frame buffer is usually configured as an x,y random access memory wherein the frame buffer is organized into x,y coordinates.

Several schemes have been employed to facilitate DMA transfer in graphics systems. Such schemes involve bit-to-bit address control, built in vector generators, and all points addressable frame buffers with multiple axes and independent square access as described by way of example in U.S. Pat. No. 4,816,814 to Lumelsky (col. 2, line 63 through col. 3, line 2). However, these schemes fail to provide a solution to the aforementioned long-felt needs in the art since they generally require complicated hardware manipulation of addresses and data and do not provide adequate generation of graphics primitives on a display device. These systems also do not aid in maximizing the serial port (refresh) of a frame buffer, and thus, they do not maximize page mode performance for frame buffers comprising VRAM array architectures.

As is known by those with skill in the art, the process of scrolling an image, or a portion of an image on a display device, involves reading pixel data from one area of a frame buffer memory and writing the data to another area. Traditionally, frame buffer memories that perform this function have been arranged such that groups of pixels along scan lines are stored at sequentially addressed memory locations. By using FIFO buffers for storing several words of pixel data which have been read from sequential memory addresses, the scrolling speed may be improved since the addresses are rapidly incremented by a counter rather than by a host display processor or controller. Such a system is described by way of example in U.S. Pat. No. 4,755,810 Knierim. The Knierim patent discloses a FIFO buffer which is provided to store sequences of data from a frame buffer and which comprises a barrel shifter to shift bit positions of the data words stored in the FIFO to facilitate proper pixel alignment during the horizontal scrolling operation.

The use of a barrel shifter as disclosed in the Knierim patent improves page mode operation and performance in a frame buffer graphics system. However, further improvements with an eye toward maximizing page mode performance and column address coherency is desired in the art. This need must be satisfied without increasing the cost and complexity of the hardware necessary to form DMA transfer circuitry. The aforementioned long-felt needs are solved by methods and apparatus provided in accordance with the present invention.

SUMMARY OF THE INVENTION

Methods and apparatus provided in accordance with the present invention satisfy the aforementioned long-felt needs in the computer graphics art for frame buffer graphics systems which have maximum column address coherency for serial and random port accesses in dual port, VRAM array frame buffers. The present invention maximizes page mode performance for VRAM arrays comprising frame buffers in graphic subsystems, or any other types of systems which utilize dual port VRAMs. With the use of methods and apparatus provided in accordance with the present invention, processing time is greatly reduced, while system performance is also enhanced for DMA transfer of data in graphics systems.

In accordance with the present invention, methods of maximizing column address coherency for serial and random port accesses in a video random access memory array frame buffer which utilizes a raster scan device to display graphics primitives are provided. The methods comprise the steps of organizing the video random access arrays into tiles and shifting the scan line data at a fixed interval across the raster scan display so that portions of several lines of the scan line data are output to the raster scan CRT to display the graphics primitives.

Further in accordance with the present invention, graphics display systems adapted to provide high performance page mode operation are provided. Such graphics display systems comprise raster scan display means having a plurality of scan lines for displaying graphics images and a frame buffer interfaced with the raster scan display means for mapping pixel value data corresponding to graphics primitives on the display means, the frame buffer being organized into a plurality of rows and columns random port interfaced with the frame buffer is also provided for outputting scan line data from a scan converter, and a serial port interfaced with the frame buffer is also provided for outputting scan line data to the raster scan display means and for refreshing the raster scan display means with the pixel value data. Barrel shifting means interfaced with the serial port is also provided for shifting the scan lines at a fixed interval so that the frame buffer outputs portions of several scan lines to the raster scan display means.

DETAILED DESCRIPTION OF PREFERRED EMBODIMENTS

Figure 1:
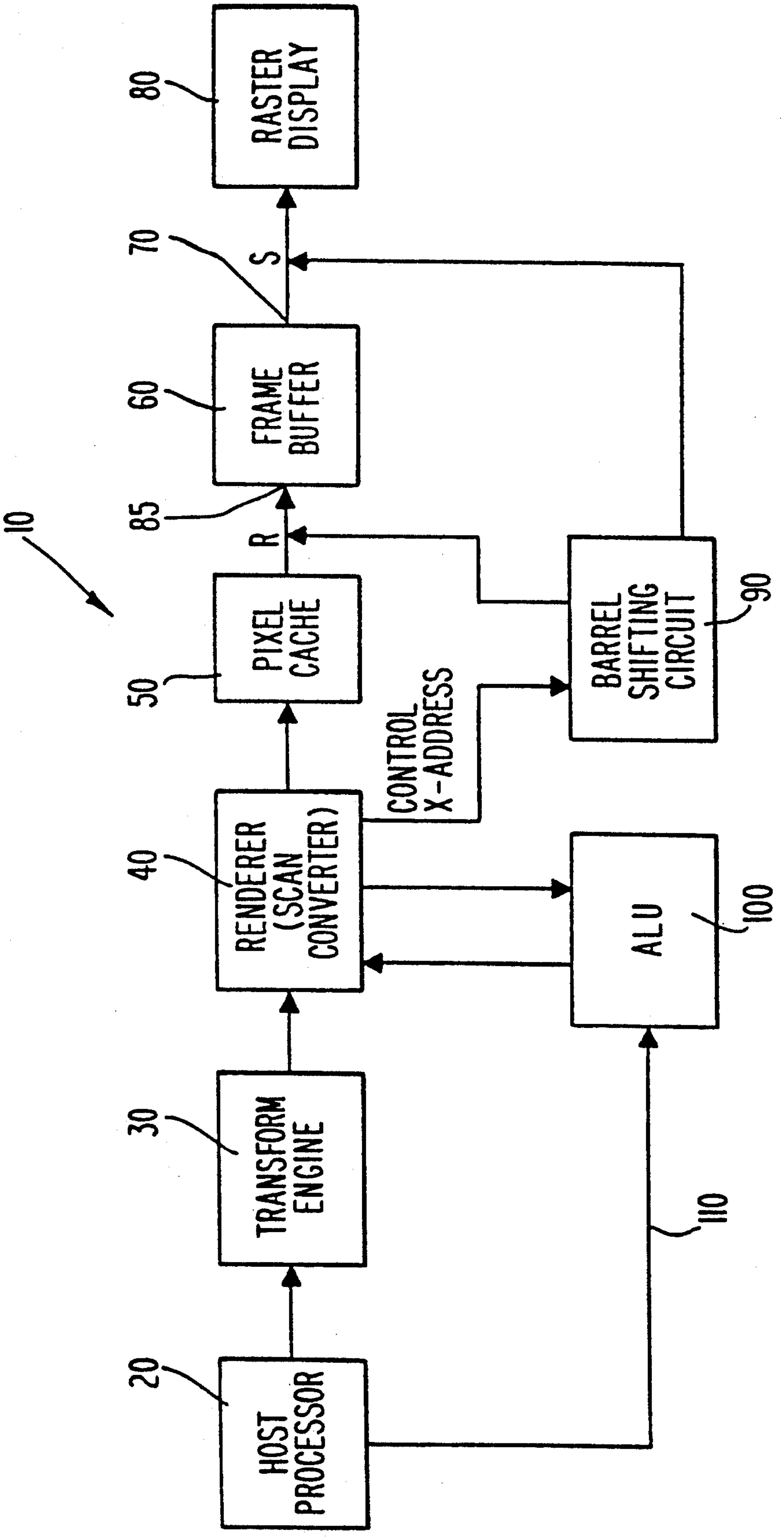
FIG. 1 is a graphics pipeline system provided in accordance with the present invention having a graphics frame buffer, raster scan display, and barrel shifting circuitry for maximizing column address coherency.

Referring now to the drawings wherein like reference numerals refer to like elements, FIG. 1 depicts a frame buffer graphics system shown generally at 10. The frame buffer graphics system 10 in preferred embodiments is a pipeline graphics system wherein the graphics components are interconnected by pipeline hardware which performs a number of system tasks. A graphics pipeline is a series of data processing elements which communicate graphics commands through the graphics system. In modern graphics systems, graphics pipelines with window architectures are evolving to support multitasking workstations.

In order to support high level systems tasks, the graphics pipeline interconnects a host processor 20 to the graphics system which provides a multiplicity of graphics commands that are available to the system and which also interfaces with the user. Host processor 20 is interfaced to a transform engine 30 along the graphics pipeline which generally comprises a number of parallel floating point processors. Transform engine 30 performs a number of system tasks including context management, matrix transformation calculations, light modeling and radiosity computations, and control of the systems's vector and polygon rendering hardware.

Rendering circuit 40 is further interfaced along the graphics pipeline with transform engine 30. In preferred embodiments, the rendering circuit further comprises a scan converter. The scan converter is preferably a raster scan converter which controls RAS and CAS operations in the frame buffer and raster display in the graphics system. In still further preferred embodiments, pixel cache means 50 is interfaced with the scan converter and rendering circuit 40. The pixel cache 50 is generally a buffered memory which maintains pixel value data that is to be rendered to the frame buffer.

A frame buffer 60 is further interfaced with pixel cache 50 along the pipeline graphics system. In preferred embodiments, frame buffer 60 comprises a plurality of VRAM chips which are organized by the renderer and other graphics pipeline hardware into tiles to form graphics primitives. As known by those with skill in the art, graphics primitives are basic shapes which comprise graphics figures that are displayed on the raster scan CRT. By organizing the VRAM array in frame buffer 60 into tiles, pixel value data can be manipulated so that the graphics primitives can be rendered to the CRT display. In still further preferred embodiments, the tiles are rectangular, but may generally take on any arbitrary shape as described in related U.S. Pat. Application Ser. No. 07/494,997 assigned to the present Assignee.

In yet further preferred embodiments, frame buffer 60 is a dual port device. A serial port 70 interfaced with frame buffer 60 and raster display 80 provides scan output refresh data to the raster display 80. Random port 85 is interfaced with the frame buffer 60 and pixel cache 50 to provide updates of the graphics primitives and scenes which are rendered on frame buffer 60 and which will be displayed on raster display 80.

In accordance with the present invention, barrel shifting circuitry 90 provides an output to the frame buffer 60 and is interfaced with renderer 40 containing the scan converter. Preferably, barrel shifting circuitry 90 comprises two barrel shifting circuits. A first barrel shifting circuit shifts data between pixel cache 50 and the random ports of the VRAMs into frame buffer 60. A second barrel shifting circuit shifts data between the VRAM serial ports and raster display 80. Control for the amount of shifting accomplished by the two barrel shifting circuits is preferably derived from the X-address of the rendered data or the refresh data, respectively.

The inventors of the subject matter herein claimed and disclosed have found that maximizing the performance of the serial port 70 of frame buffer 60 requires that the page or RAS boundaries should be as far apart as possible in the horizontal direction (scan line organized). Similarly, for the random port of the frame buffer, page boundaries ideally should be organized for square areas of the display. With methods and apparatus provided in accordance with the present invention, the performance of both ports 70 and 85 of frame buffer 60 is maximized simultaneously.

When frame buffer 60 is organized into tiles by the graphics system 10, scan line data can be vertically barrel shifted by barrel shifting circuitry 90 at fixed intervals across display 80 so that the scan line organized serial port 70 outputs data and maintains a much shorter page boundary for random port 85 accesses. Thus, the page boundaries in graphics systems employing methods and apparatus provided in accordance with this invention are effectively lengthened in the vertical direction, thereby maximizing page mode performance.

The barrel shifters in barrel shifter circuitry 90 may be any barrel shifter circuit which is commonly available in the industry. Barrel shifting circuit 90 barrel shifts scan line data from frame buffer 60 to the raster display at a fixed interval as will be discussed herein. The fixed time interval determines when the barrel shifter means 90 allows scan line data from the frame buffer to be output to raster display 80.

Interfaced with renderer 40 in the pipeline system 10 is an arithmetic logic unit (ALU) 100. ALU 100 is also interfaced with host processor 20 along a pipeline bypass bus 110. ALU 100 performs various arithmetic functions such as, for example, window and source destination addressing, and conversion of window relative addresses from frame buffer relative addresses to raster display addresses.

Figure 2:
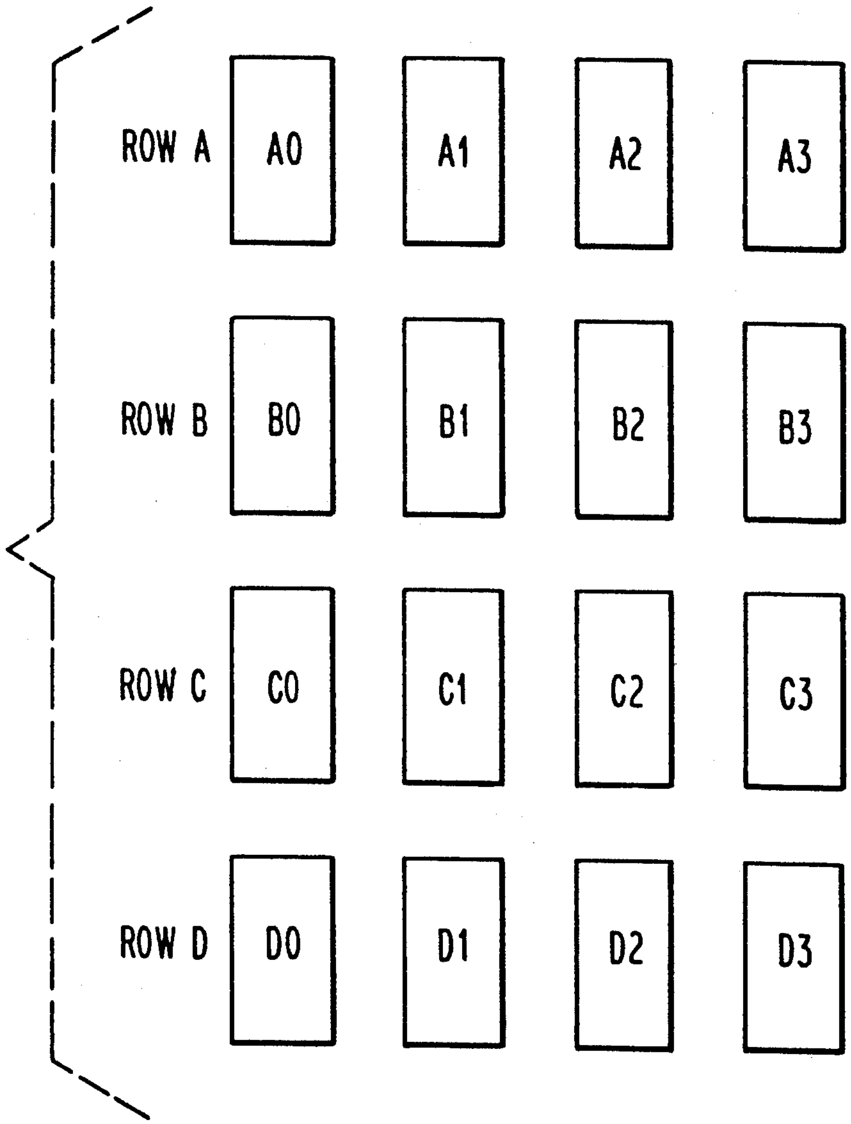
FIG. 2 is a bank of VRAM organized into a 4×4 tile in a graphics frame buffer.

FIG. 2 illustrates an exemplary plane of a 4×4 VRAM bank in the frame buffer 60 for scan line addressing in accordance with the present invention. VRAM chips are shown having row designated letter values A through D, and numbered 0 to 3 in each of the rows. Thus, for example, in row A, VRAM chips are designated A0, A1, A2 and A3. In accordance with well known rendering methods in video graphics frame buffer systems, pixel data words are stored in planes of the frame buffer memory array similar to the VRAM banks shown in FIG. 2, and organized into tiles.

In the exemplary array of FIG. 2, four rows with four, eight bit data words in each row may be stored in each tile. In preferred embodiments, the sixteen bit data words in each row correspond to pixels in a raster line on the display device. When the array is addressed, the particular one of the sixteen words currently addressed in each 4×4 tile is determined by the address bits for each of the rows, each of which are row and column address strobed. As an example of such well known addressing, refer to U.S. Pat. No. 4,755,810, Knierim, at column 4, lines 36 through 54, the teachings of which are specifically incorporated herein by reference.

In order to display a graphics primitive which is rendered by the tile of FIG. 2, a standard raster scanning technique is applied so that the graphics primitive and the pixel value data stored in the VRAMs of FIG. 2 can be written to the display CRT. While a square tile has been illustrated in FIG. 2, it will be recognized that any tile shape may be utilized with the methods and apparatus provided in accordance with the present invention as long as there is more than one scan line within a tile.

Figure 3A:
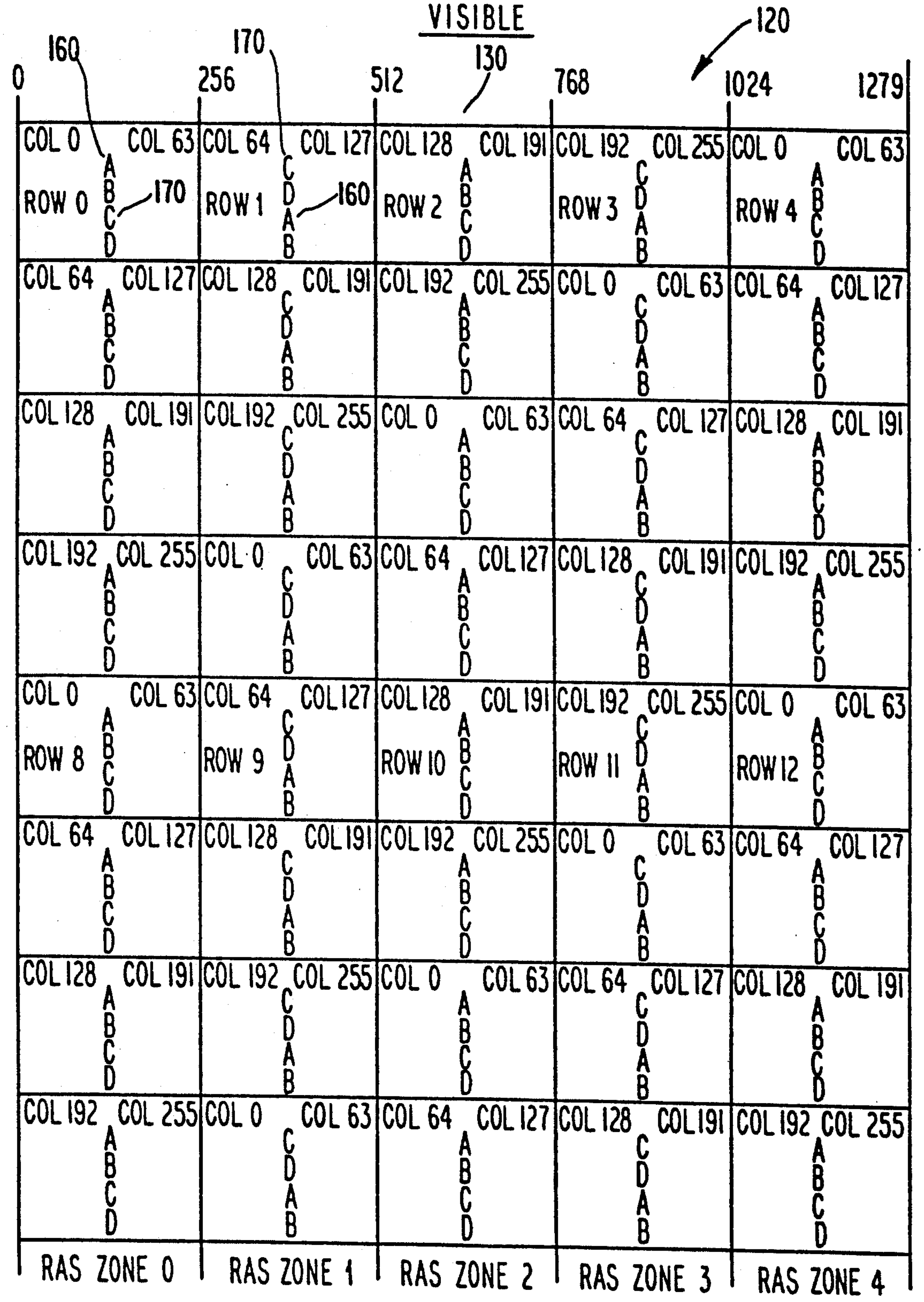
FIGS. 3A and 3B illustrate a graphics frame buffer bit map organized into a plurality of rows and columns, wherein four scan lines access the bit mapped frame buffer.
Figure 3B:
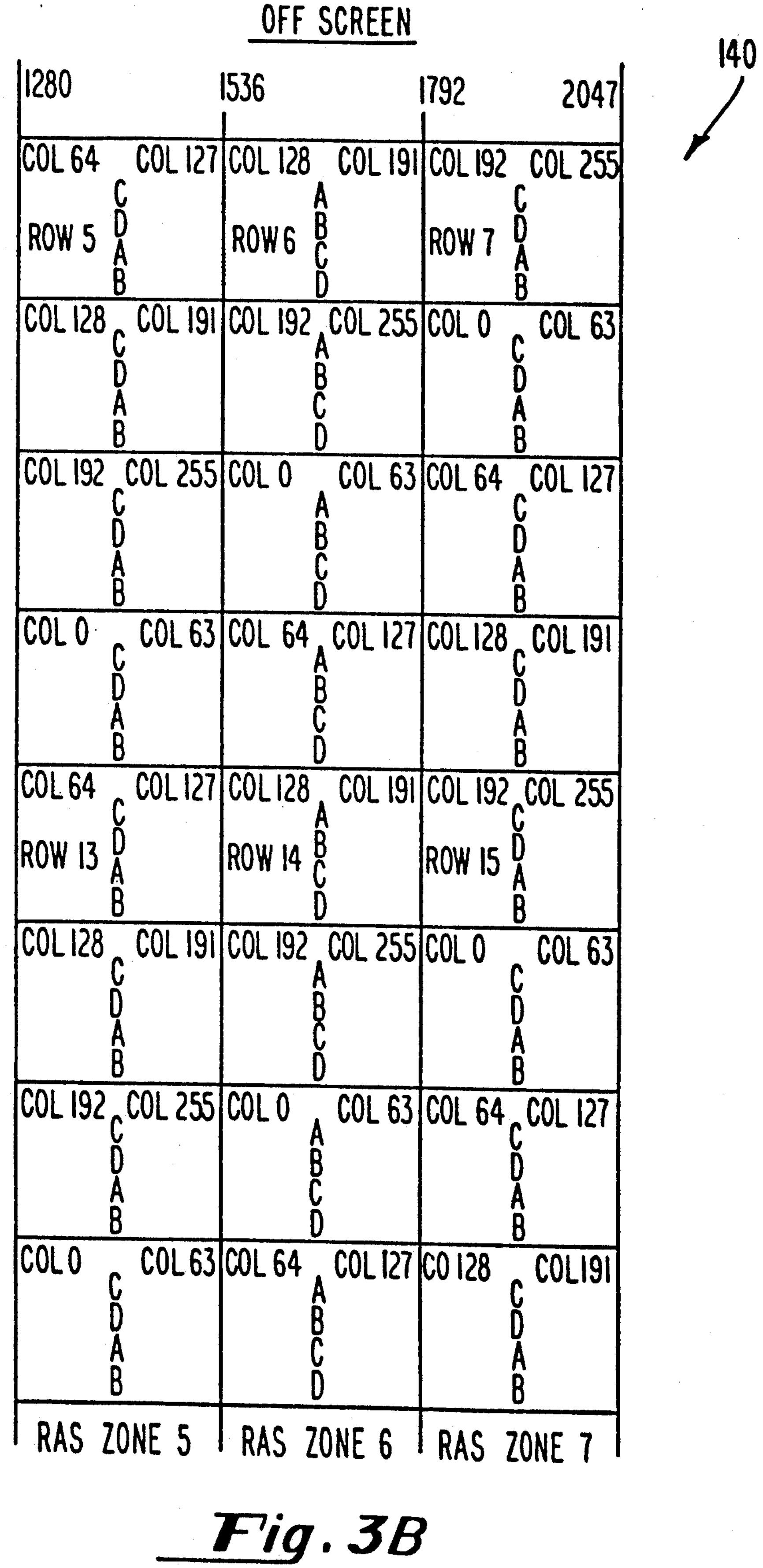

Referring now to FIGS. 3A and 3B, a frame buffer architecture 120 which is utilized in accordance with the present invention for maximizing column address coherency is split into a visible portion 130 in FIG. 3A which corresponds to a raster display, and an off-screen, invisible portion 140 in FIG. 3B which is generally viewed as a work area for window manipulation. In preferred embodiments the visible portion of the frame buffer is 1024×1280×8 bits while the invisible, off-screen area is 1024×768×8 bits. A single row address given to all VRAMs in the bank will enable page mode access to a 16×256 rectangle of pixels.

Once the data is loaded into the VRAMs corresponding to tiles and pixel value data, scan line data, which in preferred embodiments comprises four scan lines, can then be scanned out of the serial port so that the CRT can be stimulated to provide a graphics image. In still further preferred embodiments, frame buffer 120 is partitioned so that visible region 130 is broken into five RAS zones denoted as RAS zone 0, RAS zone 1, RAS zone 2, RAS zone 3, and RAS zone 4. In the RAS zone direction, the frame buffer VRAMs are broken into 64 columns. The invisible, off-screen region is partitioned into the remaining three RAS zones denoted as RAS zone 5, RAS zone 6, and RAS zone 7.

Figure 4:
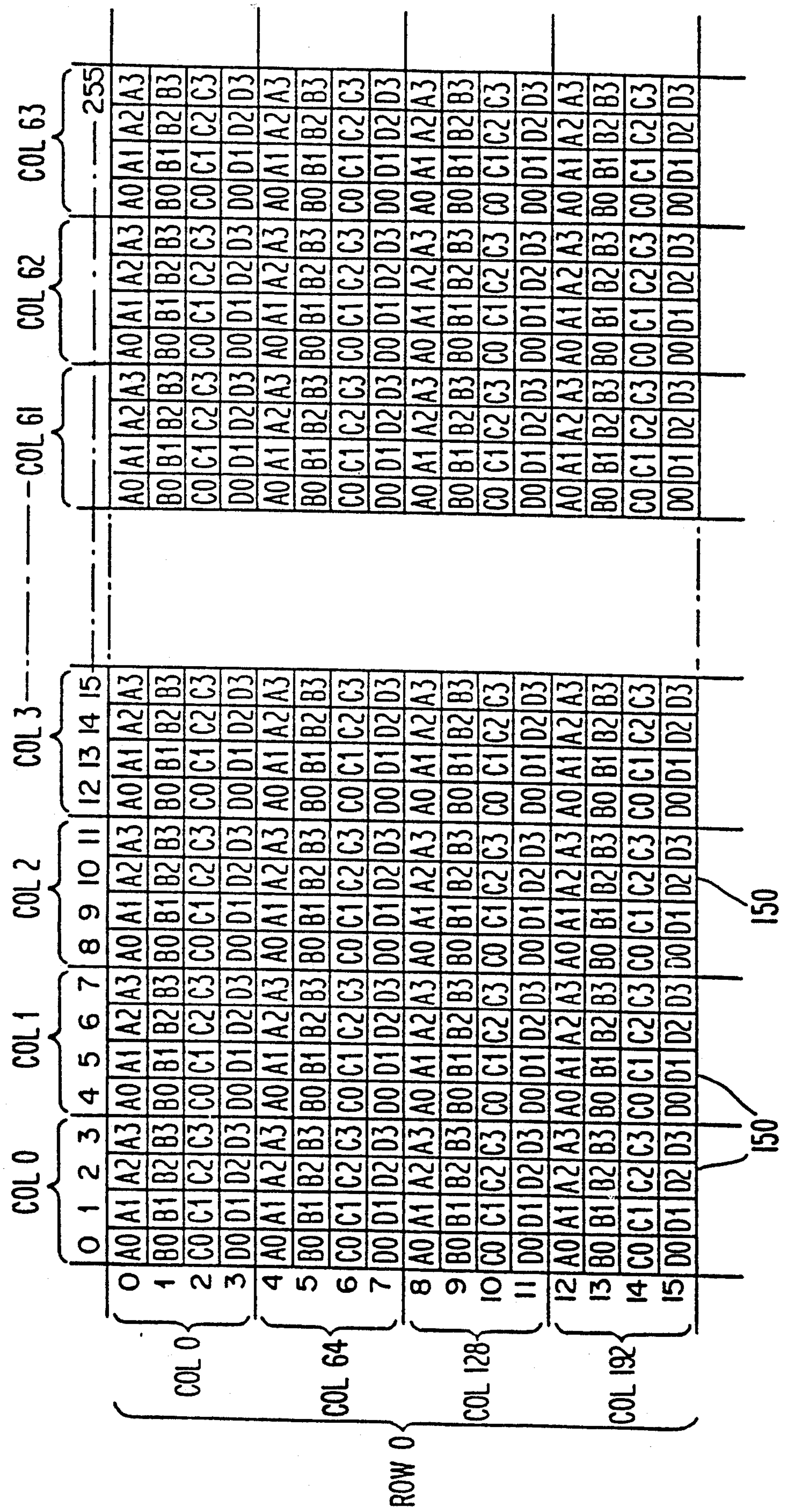
FIG. 4 is an illustration of a single row of the bit mapped frame buffer of FIG. 3.

In further preferred embodiments, FIG. 4 illustrates which particular VRAM supplies data for a portion of a scan line, and which particular VRAM row and column addresses must be addressed to access a given pixel at an x,y location. In yet further preferred embodiments, square tiles are shown generally at 150. In the exemplary case of FIG. 4, row 0 of the frame buffer addresses corresponding to 256 columns are illustrated. For each 64 columns, for example, column 0 through column 63, four scan lines must be used to output the scan line data through the dual port frame buffer to the display device so that the pixel value data can be rendered to the CRT. Referring again to FIG. 3, data for any given scan line is stored at two row addresses of the VRAMs. For instance, scan line 0 data are stored in the row A VRAMs shown generally at 160, and the row C VRAMs shown generally at 170. The first 256 pixels come from the row A VRAMs while the next 256 pixels come from row C VRAMs. This allows 512 pixels (instead of 256 pixels) to be scanned out of the serial ports before the frame buffer VRAMs need to be reloaded.

In yet further preferred embodiments there are 512 rows in the frame buffer. A single row address giving all the VRAMs in a bank will enable page mode access to a 16×256 rectangle of pixels. At each 256 pixel boundary, or every 64 columns, the source of data changes from one row of VRAM to another. If a 1×4 tile crosses the 256 pixel boundary, the data would not all come from one row address of VRAM. Thus no 1×4 tile crosses any 256 pixel boundary on a single VRAM access cycle. If it does, the tile requires two VRAM cycles to access all four pixels. Otherwise, a 1 ×4 tile may start at any pixel.

Figure 5:
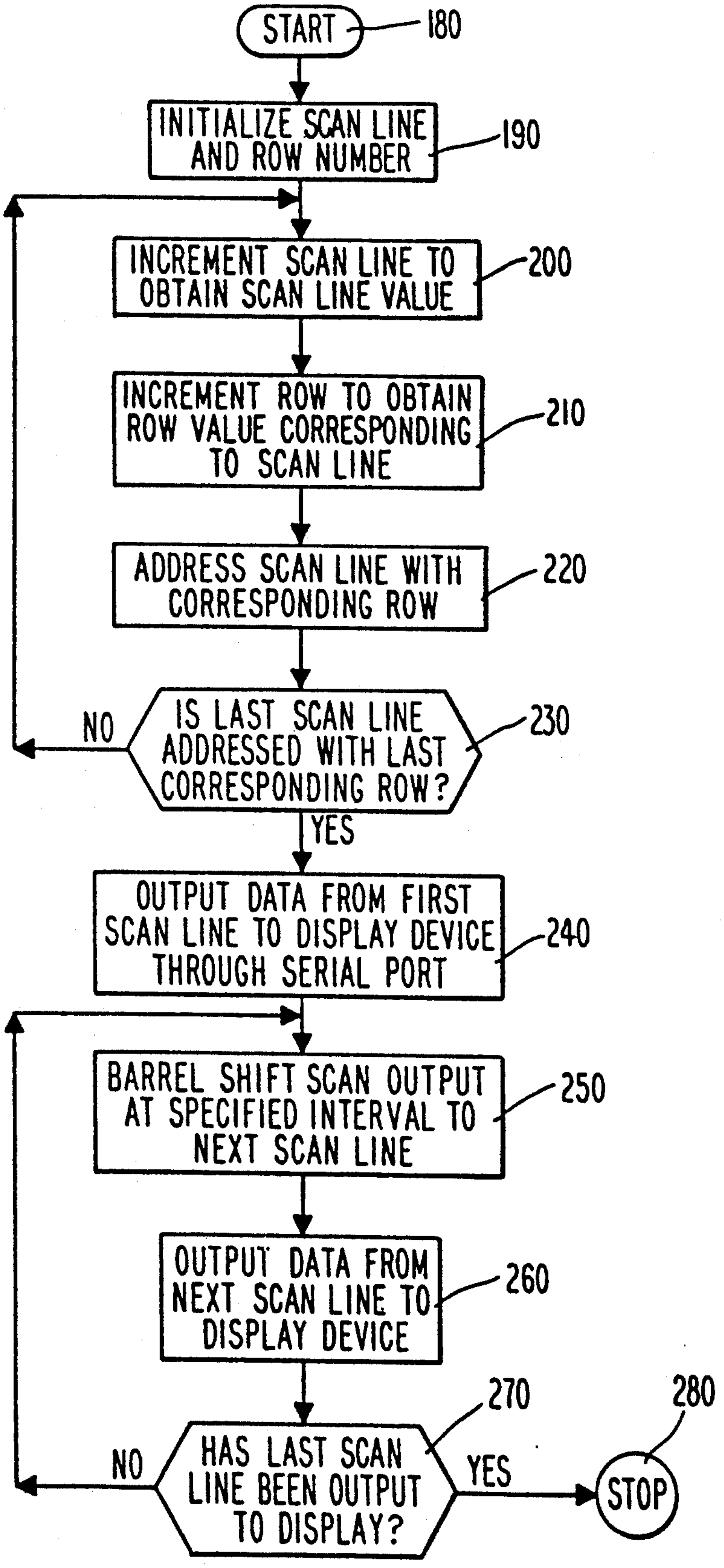
FIG. 5 is a flow chart of a preferred embodiment of methods provided in accordance with the present invention for maximizing column address coherency and improving page mode performance of a graphics frame buffer system.

In order to improve page mode performance and to maximize column address coherency for serial and random port accesses in a dual port frame buffer, methods provided in accordance with the present invention insure that the RAS zone boundaries are kept as far apart as possible. Referring to FIG. 5, a flow chart of methods to maximize column address coherency is illustrated. The method begins at step 180. At step 190 it is desired to initialize the row number and a particular scan line in the row. Infurther preferred embodiments, this initial value may be zero for both the scan line and row number.

At step 200 the scan line is incremented to obtain a scan line value, while at step 210 the row number is incremented to obtain a row value corresponding to the scan line which will access the frame buffer so that data can be output to the CRT. In still further preferred embodiments, the incrementing values at steps 200 and 210 give a particular row (N) and a scan line corresponding to a value, for example, "scan line A." For purposes of the illustrative flow chart of FIG. 5, it is assumed that a 4×4 square tile is being accessed. However, this method is applicable to all shapes of tile architectures as long as there is more than one scan line within a tile.

At step 220 the scan line is addressed with the corresponding row number. It is then desired to determine at step 230 whether the last scan line has been addressed with the last corresponding row. If the answer to this question is "no," then the method returns to step 200 where incrementing of the scan line and the row numbers, and addressing of the scan line at steps 200, 210, and 220 can be repeated. For the 4×4 square tile discussed, incrementing occurs to obtain scan line B addressed with row (N+1), scan line C addressed with row (N 30 2), and scan line D addressed with row (N+3). In preferred embodiments, once scan line D has been addressed with the (N+3) row, at step 230 the last scan line has been addressed and the method proceeds.

In still further preferred embodiments, at step 240 data is then output to the first scan line (scan line A) on the display device through the serial port of the frame buffer. In accordance with the present invention at step 250, the scan line output is then barrel shifted at a specified fixed interval to the next scan line, scan line B, at step 25. The data is then similarly output to scan line B at step 260 on the display device.

At step 270 it is determined whether data to the last scan line has been output from the frame buffer to the display. For a preferred 4×4 tile, scan line B is not the last scan line to which data is output to the display device and so the method returns to step 250 where scan line B is barrel shifted to scan line C so that at step 260 scan line C output data can be bussed to the display device or CRT. Similarly, the remaining scan lines can be barrel shifted at the fixed interval so that scan line D output data is also bussed to the display device. After scan line D output data has been bussed to the CRT, the method stops at 280.

In still further preferred embodiments of methods provided in accordance with the present invention, the fixed interval to activate the barrel shifter so that the scan lines can be switched is determined by taking the number of columns in the row divided by eight. The denominator "eight" is desired since there are preferably four rows represented along a scan line, and a factor of "two" is applied to the denominator since current VRAMs allow the serial port to be loaded with columns from two unique rows. This arrangement is denoted a "split shift register." Thus, for the frame buffer of FIG. 3 wherein there are 64 columns per RAS zone, the RAS zones are changed at intervals of 16 so that scan output is switched from scan A to scan B to scan C to scan D at fixed intervals of 16 RAM access cycles.

The net result of the application of this method is that the serial port behaves as if it has output an entire row of data while it has actually only output parts of four rows of data. This allows the random port in the frame buffer to organize columns four times higher in the vertical direction so that the page boundaries (RAS) are four times as far apart in the vertical direction. Thus, with methods and apparatus provided in accordance with the present invention, column address coherency is greatly improved, page mode performance is maximized, and the serial and random ports of the VRAMs perform optimally. Thus, methods and apparatus provided in accordance with the present invention solve a long-felt need in the art for methods and apparatus which improve frame buffer performance and reduce processor time.

There have thus been described certain preferred embodiments of methods and apparatus for maximizing column address coherency for serial and random ports in a graphics frame buffer comprising a VRAM array. While preferred embodiments have been disclosed and described, it will be recognized by those with skill in the art that modifications are within the true spirit and scope of the invention. The appended claims are intended to cover all such modifications.

What is claimed is:

1. A method of displaying pixel data on a video display, comprising the steps of:

(a) storing said pixel data in a video random access memory (VRAM) having a parallel port and a serial port, said VRAM comprising a plurality of memory chips organized into rows and columns, said memory chips storing said pixel data as respective tiles corresponding to a predetermined number of pixels in each scan line for a predetermined number of scan lines of said video display;

(b) for an even scan line of said video display, barrel shifting to said serial port of said VRAM a predetermined number of columns of pixel data starting with a first row of memory chips specified by a first row address of said VRAM for respective tiles of said pixel data, where each column includes said predetermined number of pixels in each scan line;

(c) after said predetermined number of columns of pixel data has been shifted to said serial port of said VRAM for said even scan line of said video display, barrel shifting to said serial port of said VRAM a predetermined number of columns of pixel data from a second row of memory chips specified by a second row address of said VRAM for respective tiles of said pixel data, where each column includes said predetermined number of pixels in each scan line;

(d) for an odd scan line of said video display, barrel shifting to said serial port of said VRAM a predetermined number of columns of pixel data starting with said second row of memory chips specified by said first row address of said VRAM for respective tile of said pixel data, where each column includes said predetermined number of pixels in each scan line;

(e) after said predetermined number of columns of pixel data has been shifted to said serial port of said VRAM for said odd scan line of said video display, barrel shifting to said serial port of said VRAM a predetermined number of columns of pixel data from said first row of memory chips specified by said second row address of said VRAM for respective tiles of said pixel data, where each column includes said predetermined number of pixels in each scan line;

(f) for each subsequent even scan line of said video display, barrel shifting to said serial port of said VRAM a predetermined number of columns of pixel data starting with said first row of memory chips specified by said first row address of said VRAM but at a different column than that column at which barrel shifting started for the immediately previous even scan line;

(g) for each subsequent odd scan line of said video display, barrel shifting to said serial port of said VRAM a predetermined number of columns of pixel data starting with said second row of memory chips specified by said first row address of said VRAM but at a different column than that column at which barrel shifting started for the immediately previous odd scan line;

(h) outputting to said video display from said serial port of said VRAM portions of respective scan lines of said video display from each row of memory chips specified by said first and second row addresses for said predetermined number of scan lines; and (i) repeating steps (b)-(h) for subsequent row addresses of said VRAM until all display pixels visible to a viewer have been shifted to said video display.

2. The method recited in claim 1, comprising the further step of organizing said plurality of memory chips of said VRAM into 16 memory chips arranged into 4 rows and 4 columns, whereby said predetermined number of pixels in each scan line of respective tiles is 4 adjacent pixels and said predetermined number of scan lines of respective tiles i 4 consecutive scan lines of said video display.

3. The method recited in claim 2, comprising the further step of providing a row address of said VRAM to said first and second rows of memory chips to enable page mode access to a rectangle of pixels on said video display having 256 pixels in the scan line direction and 16 pixels in a direction perpendicular to said scan line direction, wherein after every 256 pixels in said scan line direction are accessed via said parallel port and stored in said memory chips, the memory chips which provide a source of data for said shifting steps (b) and (c) for an even scan line and steps (d) and (e) for an odd scan line are changed from said first row of memory chips to a third row of memory chips or from said second row of memory chips to a fourth row of memory chips for said shifting steps (f) and (g) for subsequent even and odd scan lines in accordance with said row address of said VRAM.

4. The method recited in claim 2, wherein said outputting step comprises the step of outputting from said serial port parts of four scan lines of pixel data for each row address of said VRAM.

5. The method recited in claim 2, comprising the further step of determining said predetermined number of columns of pixel data shifted from said first and second rows of memory chips for each scan line in accordance with the following relationship:

$$\text{Number of Columns} = \frac{\text{number of columns in a scan line}}{8}.$$

6. A graphic display system adapted to provide high performance page mode operation, comprising:

a raster scanned video display comprising a plurality of scan lines for displaying pixel data;

a video random access memory (VRAM) having a parallel port and a serial port, said VRAM comparing a plurality of memory chips organized into rows and columns, said memory chips storing sad pixel data as respective tiles corresponding to a predetermined number of pixels in each scan line for a predetermined number of scan lines of said video display; and a barrel shifter disposed between said parallel and serial ports of said VRAM for barrel shifting to said serial port of said VRAM, for an even scan line of said video display, a predetermined number of columns of pixel data starting with a first row of memory chips specified by a first row address of said VRAM for respective tiles of said pixel data, where each column includes said predetermined number of pixels in each scan line, for barrel shifting to said serial port of said VRAM, after said predetermined number of columns of pixel data has been shifted to said serial port of said VRAM for said even scan line of said video display, a predetermined number of columns of pixel data from a second row of memory chips specified by a second row address of said VRAM for respective tiles of said pixel data, where each column includes said predetermined number of pixels in each scan line, for barrel shifting to said serial port of said VRAM, for an odd scan line of said video display, a predetermined number of columns of pixel data starting with said second row of memory chips specified by said first row address of said VRAM for respective tiles of said pixel data, where each column includes said predetermined number of pixels in each scan line, for barrel shifting to said serial port of said VRAM , after said predetermined number of columns of pixel data has been shifted to said serial port of said VRAM for said odd scan line of said video display, a predetermined number of columns of pixel data from said first row of memory chips specified by said second row address of said VRAM for respective tiles of said pixel data, where each column includes said predetermined number of pixels in each scan line, for each subsequent even scan line of said video display, barrel shifting to said serial port of said VRAM a predetermined number of columns of pixel data starting with said first row of memory chips specified by said first row address of said VRAM but at a different column than that column at which barrel shifting started for the immediately previous even scan line, and for each subsequent odd scan line of said video display, barrel shifting to said serial port of said VRAM a predetermined number of columns of pixel data starting with said second row of memory chips specified by said first row address of said VRAM but at a different column than that column at which barrel shifting started for the immediately previous odd scan line, wherein said serial port of said VRAM outputs to said video display portions of respective scan lines of said video display from each row of memory chips specified by each row address of said VRAM until all display pixels visible to a viewer have been output to said video display.

7. The graphics display system recited in claim 6, wherein said VRAM comprises a split shift register which loads said serial port of said VRAM with columns of pixel data at addresses of said VRAM identifying said first and second rows of memory chips within said VRAM.

8. The graphics display system recited in claim 6, wherein said VRAM is organized into 16 memory chips arranged into 4 rows and 4 columns and said predetermined number of pixels in each scan line of respective tiles is 4 adjacent pixels and said predetermined number of scan lines of respective tiles is 4 consecutive scan lines of said video display.

9. The graphics display system recited in claim 8, wherein a row address of said VRAM is provided to said first and second rows of memory chips to enable page mode access to a rectangle of pixels on said video display having 256 pixels in the scan line direction and 16 pixels in a direction perpendicular to said scan line direction, and wherein after every 256 pixels in said scan line direction are accessed via said parallel port and stored in said memory chips, the memory chips which provide a source of data for said barrel shifter for a scan line are changed from said first row of memory chips to a thrid row of memory chips or from said second row of memory chips to a fourth row of memory chips in accordance with said row address of said VRAM for said scan line.

10. The graphics display system recited in claim 8, wherein said serial port of said VRAM outputs parts of four scan lines of pixel data for each row address of said VRAM.

11. The graphics display system recited in claim 8, wherein said predetermined number of columns of pixel data shifted by said barrel shifter from said first and second rows of memory chips for each scan line is determined in accordance with the following relationship:

$$\text{Number of Columns} = \frac{\text{number of columns in a scan line}}{8}.$$

* * * * *